(12) United States Patent
Licitar

(10) Patent No.: US 12,330,937 B1
(45) Date of Patent: Jun. 17, 2025

(54) APPARATUSES AND METHODS FOR PRODUCING HYDROGEN FROM SAND AND WATER

(71) Applicant: Antonijo Licitar, Zagreb (HR)

(72) Inventor: Antonijo Licitar, Zagreb (HR)

( * ) Notice: Subject to any disclaimer, the term of this patent is extended or adjusted under 35 U.S.C. 154(b) by 0 days.

(21) Appl. No.: 18/589,002

(22) Filed: Feb. 27, 2024

(30) Foreign Application Priority Data

Dec. 15, 2023 (EP) .................... 23383307

(51) Int. Cl.
*C01B 3/06* (2006.01)

(52) U.S. Cl.
CPC .................... *C01B 3/065* (2013.01)

(58) Field of Classification Search
CPC ..... C01B 3/065; C01B 3/042; C01B 2202/30; C01B 32/16; C01B 35/00; C01B 32/50; C01B 32/60; C01B 32/15; C01B 32/182; C01B 33/1585; C01B 32/184; B01J 19/244; B23C 3/18; B22F 2009/041
See application file for complete search history.

(56) References Cited

U.S. PATENT DOCUMENTS

| | | | |
|---|---|---|---|
| 11,154,868 B2 | 10/2021 | Licitar et al. | |
| 11,607,693 B2 | 3/2023 | Licitar et al. | |
| 2012/0148486 A1* | 6/2012 | Wang | C01B 3/08 423/657 |
| 2019/0216082 A1* | 7/2019 | Kobayashi | A23K 20/20 |

OTHER PUBLICATIONS

Akly et al. "Preparation and Characterization of Silica Nanoparticles by Wet Mechanical Attrition of White and Yellow Sand" J Nanomed Nanotechnol 2013, 4:6 (Year: 2013).*
Sitek et al. "On the Preparation of Precursors and Carriers of Nanoparticles by Water Jet Technology" Tehnički vjesnik 19, 3(2012), 465-474 (Year: 2012).*
Meftah et al. "Extraction and Physicochemical Characterization of Highly-pure Amorphous Silica Nanoparticles from Locally Available Dunes Sand" Chemistry Africa (2023) 6:3039-3048 (Year: 2023).*

* cited by examiner

*Primary Examiner* — Wayne A Langel
*Assistant Examiner* — Syed T Iqbal
(74) *Attorney, Agent, or Firm* — DLA PIPER LLP (US)

(57) ABSTRACT

A method may provide a mechanical mill for reducing a size of particles; wherein the mechanical mill includes: a core for accelerating particles, the core including: a first disc and a second disc facing the first disc in an axial direction, wherein each of the first disc and the second disc includes a plurality of concentric rings and a plurality of concentric channels alternately interleaved with the plurality of concentric rings; and wherein the first disc, the second disc, or a combination thereof are rotated. A method may introduce water into the mechanical mill. A method may introduce soil particles into the mechanical mill. A method may activate the mechanical mill to accelerate the water and the soil particles. A method may thereby produce nanoparticles from the soil particles and producing hydrogen from a reaction between the nanoparticles and the water.

19 Claims, 10 Drawing Sheets

APPARATUSES AND METHODS FOR PRODUCING HYDROGEN FROM SAND AND WATER

CROSS-REFERENCE TO RELATED APPLICATIONS

This application claims priority to European Application No. 23383307 filed on Dec. 15, 2023, which is hereby incorporated by reference in its entirety.

FIELD

The present disclosure relates to systems and methods for producing hydrogen. More particularly, the present disclosure relates to methods and systems that produce hydrogen out of soil particles, particularly sand particles, more specifically desert sand.

BACKGROUND

The growing demand for clean and sustainable energy sources has led to an increased interest in hydrogen gas production. Hydrogen is a versatile energy carrier, which can help tackle critical energy challenges.

Hydrogen is one of the few materials that is regarded as an energy carrier which may be used to power transportation, such as cars, boats, or even aircraft. Although hydrogen can be obtained from natural gas, oil, or coal, a more sustainable method for obtaining hydrogen (and reducing greenhouse gas emissions) relies on hydrolysis of water. Hydrolysis of water is, however, energy intensive and thus relies on the use of significant amounts of electricity. In order for hydrogen to qualify as "green hydrogen" and truly be sustainable, the electricity should be provided from renewable sources such as solar or wind energy. It is desirable to find methods and systems which can produce hydrogen sustainably with a reduced energy requirement.

Although the need for hydrogen is not particularly linked to a specific geographical area, it would also be beneficial to provide hydrogen to third world countries where power sources are scarce, including those with extreme temperatures.

Nanoparticles have at least one of their dimensions, optionally all their dimensions, between 1 nm and 100 nm. As the surface area to volume ratio of the material increases in the nanoscale, the properties of the nanoparticles may be different from the properties of larger particles. Nanoparticles are used in a wide range of fields, for example, medicine, electronics, materials science, and others.

One known method for obtaining nanoparticles involves a mechanical mill, disclosed in U.S. Pat. Nos. 11,154,868 B2 and 11,607,693 B2, which are incorporated by reference herein in their entirety. In these documents, two rotors including aerodynamical blades which can be rotated in opposite directions are described. Micron sized solid material can be introduced into the mill. By colliding the solid material with itself, the size of the particles of the solid material is reduced until nanoparticles can be obtained. Other systems to obtain nanoparticles may rely on ball mills wherein a solid material, such as a powder, is introduced into the mill. By spinning the mill, the balls collide with the solid material and break down the material to obtain nanoparticles.

The present disclosure aims at providing systems which can combine hydrogen generation with production of nanoparticles. The present disclosure further aims at providing cost- and energy-efficient methods and systems for obtaining hydrogen.

SUMMARY

In some aspects, the techniques described herein relate to a method for producing hydrogen, including: introducing water and soil particles into a mechanical mill; activating the mechanical mill to accelerate the water and the soil particles, thereby producing nanoparticles; and producing hydrogen from a reaction between the nanoparticles and the water.

In some aspects, the techniques described herein relate to a method, wherein the soil particles include sand particles.

In some aspects, the techniques described herein relate to a method according to any of the above aspects, wherein the soil particles include Sahara desert sand particles.

In some aspects, the techniques described herein relate to a method according to any of the above aspects, wherein the water includes seawater, waste water, or a combination thereof.

In some aspects, the techniques described herein relate to a method according to any of the above aspects, wherein the soil particles and the water are mixed prior to introducing the soil particles and the water into the mechanical mill.

In some aspects, the techniques described herein relate to a method according to any of the above aspects, further including introducing carbon dioxide into the mechanical mill.

In some aspects, the techniques described herein relate to a method according to any of the above aspects, further including introducing a hydroxide compound to mechanical mill.

In some aspects, the techniques described herein relate to a method according to any of the above aspects, further including collecting the hydrogen from the mechanical mill.

In some aspects, the techniques described herein relate to a method according to any of the above aspects, further including collecting the nanoparticles from the mechanical mill.

In some aspects, the techniques described herein relate to a method according to any of the above aspects, wherein accelerating the water and the soil particles causes a cavitation effect, and wherein changing a flow direction of the water causes a water hammer effect.

In some aspects, the techniques described herein relate to a method for producing hydrogen, including: providing a mechanical mill for reducing a size of particles; wherein the mechanical mill includes: a core for accelerating particles, the core including: a first disc and a second disc facing the first disc in an axial direction; wherein each of the first disc and the second disc includes a plurality of concentric rings and a plurality of concentric channels alternately interleaved with the plurality of concentric rings; and wherein the first disc, the second disc, or a combination thereof are rotated; introducing water into the mechanical mill; introducing soil particles into the mechanical mill; and activating the mechanical mill to accelerate the water and the soil particles; thereby producing nanoparticles from the soil particles and producing hydrogen from a reaction between the nanoparticles and the water.

In some aspects, the techniques described herein relate to a method, wherein each of the first disc and the second disc includes: a plurality of holes extending from the plurality of concentric channels and the plurality of concentric rings at an angle of between 2° and 89° with respect to the axial direction; wherein the plurality of concentric rings of the first disc are arranged facing the plurality of concentric channels of the second disc; and wherein the plurality of concentric rings of the second disc are arranged facing the plurality of concentric channels of the first disc.

In some aspects, the techniques described herein relate to a method according to any of the above aspects, wherein each of the plurality of concentric rings includes: a blade base and a plurality of hypersonic blades arranged on the blade base; wherein each of the plurality of hypersonic blades includes a sharp leading edge, a sharp trailing edge and a suction surface and pressure surface configured to produce an expansion wave; wherein each of the plurality of hypersonic blades of the plurality of concentric rings of the first disc are arranged in the channels of the second disc; and wherein each of the plurality of hypersonic blades of the plurality of concentric rings of the second disc are arranged in the channels of the first disc.

In some aspects, the techniques described herein relate to a method according to any of the above aspects, wherein the first disc is rotated in a first direction, and the second disc is rotated in a second direction.

In some aspects, the techniques described herein relate to a method according to any of the above aspects, further including collecting the hydrogen from the mechanical mill.

In some aspects, the techniques described herein relate to a method according to any of the above aspects, wherein accelerating the water and the soil particles causes a cavitation effect, and wherein changing a flow direction of the water causes a water hammer effect.

In some aspects, the techniques described herein relate to a method for producing hydrogen, including: providing a mechanical mill for reducing a size of particles; wherein the mechanical mill includes: a core for accelerating particles, the core including: a first cylinder having a radially outer surface and a radially inner surface, and a second cylinder having a radially outer surface and a radially inner surface; and wherein the second cylinder radially surrounds the first cylinder, and the first cylinder, the second cylinder, or a combination thereof are rotated; introducing water into the mechanical mill; introducing soil particles into the mechanical mill; activating the mechanical mill to accelerate the water and the soil particles; thereby producing nanoparticles from the soil particles and producing hydrogen from a reaction between the nanoparticles and the water.

In some aspects, the techniques described herein relate to a method, wherein the first cylinder includes a plurality of first through holes extending from the radially inner surface to the radially outer surface of the first cylinder and wherein the second cylinder includes a plurality of second through holes extending from the radially inner surface to the radially outer surface of the second cylinder; wherein the plurality of first through holes and the plurality of second through holes have a smaller cross-section at the radially inner surface than at the radially outer surface.

In some aspects, the techniques described herein relate to a method according to any of the above aspects, wherein the first cylinder is rotated in a first direction, and the second cylinder is rotated in a second direction.

In some aspects, the techniques described herein relate to a method according to any of the above aspects, wherein accelerating the water and the soil particles causes a cavitation effect, and wherein changing a flow direction of the water causes a water hammer effect.

BRIEF DESCRIPTION OF THE DRAWINGS

Aspects, features, benefits, and advantages of the embodiments described herein will be apparent with regard to the following description, appended claims, and accompanying drawings where:

DETAILED DESCRIPTION

Figure 1A:
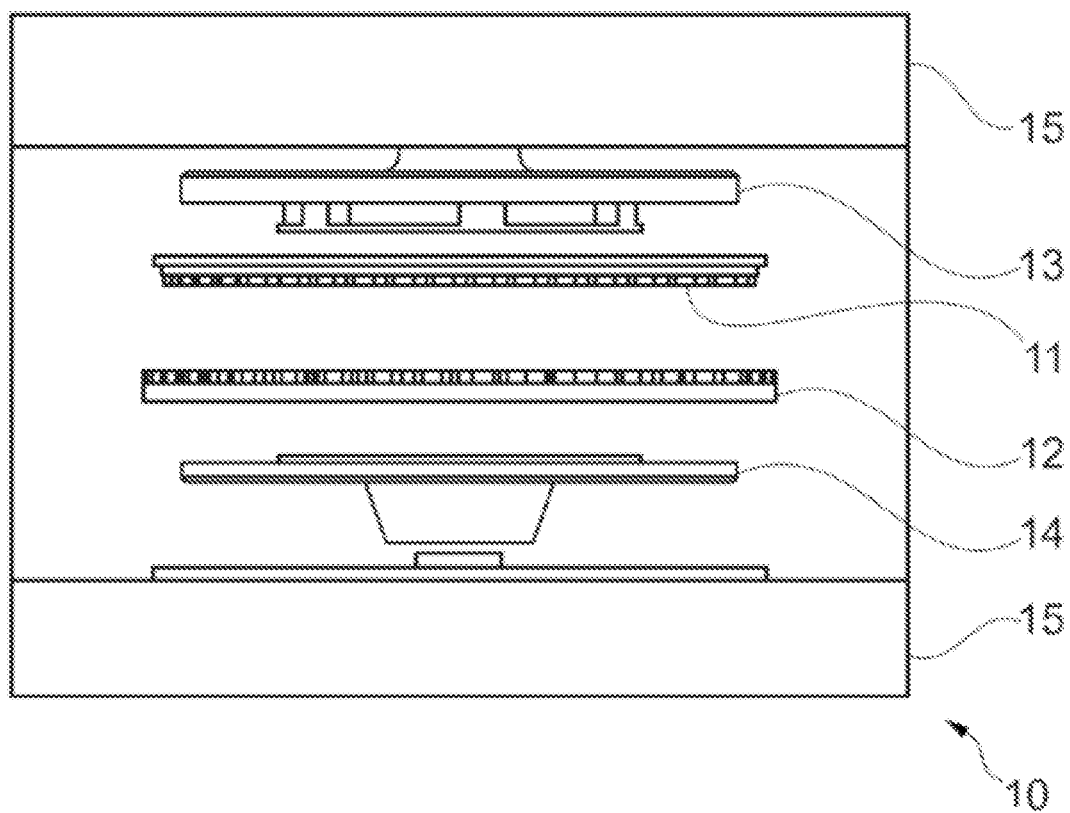
FIGS. 1A-1F schematically illustrate a first example of a mechanical mill that may be used in embodiments of the present disclosure.

The present disclosure describes methods and systems for producing hydrogen using a mechanical mill which allows the use of waste materials and water, rather than costly or sensitive starting materials.

The production of nanoparticles, particularly those of high commercial value such as silicon nanoparticles, often require costly starting materials, high energy input, and extensive equipment. Similarly, the production of hydrogen is an intensive and costly process. Combining these two processes using an efficient and low-energy system provides an exciting opportunity to produce a green energy source while also obtaining a commercially valuable byproduct. In particular, the present disclosure provides methods and systems of producing hydrogen and nanoparticles, including nanoparticles of silicon, from abundant and/or waste materials, including seawater and sand.

Reference will now be made in detail to embodiments of the present disclosure, one or more embodiments of which are illustrated in the drawings. Each embodiment is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Method of Producing Hydrogen and Nanoparticles

There is provided a method for producing hydrogen, including: introducing water and soil particles into a mechanical mill; and activating the mechanical mill to accelerate the water and the soil particles and thereby produce nanoparticles; and producing hydrogen from a reaction between the nanoparticles and the water.

There is also provided a method for producing hydrogen, including providing a mechanical mill for reducing a size of particles; wherein the mechanical mill can include a core for accelerating particles, the core including a first disc and a second disc facing the first disc in an axial direction; wherein each of the first disc and the second disc can include a plurality of concentric rings and a plurality of concentric channels alternately interleaved with the plurality of concentric rings; and wherein the first disc, the second disc, or a combination thereof are rotated; introducing water into the mechanical mill; introducing soil particles into the mechanical mill; and activating the mechanical mill to accelerate the water and the soil particles; thereby producing nanoparticles from the soil particles and producing hydrogen from a reaction between the nanoparticles and the water.

There is also provided a method for producing hydrogen, including: providing a mechanical mill for reducing a size of particles; wherein the mechanical mill includes a core for accelerating particles, the core including a first cylinder having a radially outer surface and a radially inner surface, and a second cylinder having a radially outer surface and a radially inner surface; and wherein the second cylinder radially surrounds the first cylinder, and the first cylinder, the second cylinder, or a combination thereof are rotated; introducing water into the mechanical mill; introducing soil particles into the mechanical mill; activating the mechanical mill to accelerate the water and the soil particles; thereby producing nanoparticles from the soil particles and producing hydrogen from a reaction between the nanoparticles and the water.

In embodiments, soil may be regarded as a mixture of eroded rock, minerals, partly decomposed organic matter, and other materials. Sand is broken down rock and minerals, primarily those rich in silica. Sand is one component of soil.

In embodiments, the soil particles can include sand. Sand may herein be regarded as a type of soil. In further embodiments, other soil materials may be used, such as soil which is rich in metal content. In embodiments, other soil materials may refer to mining materials, including but not limited to coal.

Sand particles may include desert sand, particularly Sahara desert sand. Sahara desert sand can include quartz, feldspar, calcite, gypsum, mica, clay minerals, iron oxides, and other minerals. When introduced into the mechanical mill which reduces the size of the particles, the desert sand can be transformed into nano-sized silicon, iron, aluminum, and titanium, such as with dimensions below 100 nm, enhancing their reactivity with water. When water such as sea water is introduced into the same mechanical mill, hydrogen gas may be obtained.

The composition of Sahara desert sand in an example may be roughly the following (by weight): Quartz: 50%, Feldspar: 20%, Calcite: 10%; Gypsum: 5%; Mica: 2%; Clay Minerals: 5%; Iron Oxides: 5%; and other minor minerals: 3%. These percentages should only be considered rough estimates and may vary in different regions of the Sahara desert. In the following, the role of the other minor minerals will be ignored, even though also their reactivity may be enhanced when collided with other particles to reduce their size.

Quartz is one of the most abundant minerals in desert sand. Quartz is a crystalline form of silicon dioxide ($SiO_2$) and appears as small, colorless, or translucent grains. Feldspar is another common mineral found in desert sand, and belongs to a group of minerals containing aluminum and silica, and it comes in various colors such as white, pink, or gray. Calcite is a carbonate mineral composed of calcium carbonate ($CaCO_3$) which may occur in desert sand in the form of small, white, or colorless grains. Gypsum is a hydrated calcium sulfate mineral ($CaSO_4 \cdot 2H_2O$) which can be present in desert sand in the form of white, soft, and fine-grained particles. Mica is a group of silicate minerals characterized by excellent cleavage and ability to split into thin, flexible sheets. Mica can be found in desert sand as small, shiny flakes. Various clay minerals may also be present in desert sand, such as kaolinite, illite, or montmorillonite. These minerals are fine-grained and have a layered structure. Desert sand may contain iron oxides, giving it a reddish or yellowish color in some areas. In addition to the major minerals mentioned above, desert sand can contain traces of various other minerals, including but not limited to garnet, tourmaline, and zircon, among others.

In embodiments, the soil particles may be sand particles. For example, the soil particles can include desert sand particles, and particularly Sahara desert sand particles. The composition of Sahara desert sand, which can contain quartz, feldspar, calcite, gypsum, mica, clay minerals, iron oxides, and other minor minerals, has been found particularly suitable for the present method. In other embodiments, other types of sand, preferably sand with relatively high quantities of silicon or silicon dioxide, may be used. In further embodiments, sand may also be mixed with other materials, particularly materials including compounds capable of oxygen reduction. For example, sand particles can be mixed with aluminum, calcium, magnesium, or oxides or combinations thereof. In other embodiments, other soil particles, particularly soil rich in metals may be used and/or other oxidizable materials may be used.

In embodiments, the water can include seawater, waste water, or a combination thereof. In other embodiments, the water may include contaminated water, such as water contaminated with oil or other hydrocarbons. In further embodiments, the water can include fresh water, tap water, sewage water, or other water sources including waste water.

In embodiments, the sand particles and the water can be mixed prior to introducing them into the mechanical mill. The resulting working liquid may be a dispersion or a slurry. In other embodiments, sand and water may be introduced separately into the mechanical mill and be mixed in the mechanical mill itself.

In embodiments, the method may further include introducing a hydroxide compound to the mechanical mill for inducing a reaction between the water and the soil particles, or between the water and the nanoparticles produced from the soil particles. Colliding oxidizable metallic material contained in the sand may activate the material such that the produced nanoparticles are able to react with water molecules. Alkaline water, that is, water in which there is an excess of hydroxide ions ($OH^-$) over hydrogen ions ($H^+$), may also be used, though alkaline water is not required. Other additives may also be added for improving the reaction between the sand particles and the water.

In embodiments, carbon dioxide may be introduced. In specific embodiments, the carbon dioxide may be captured from the surroundings, such as the surrounding air. In further embodiments, carbon monoxide or other gases may be introduced, specifically other gases capable of inducing a chemical reduction reaction. In embodiments, the carbon dioxide can contribute to inducing or accelerating the reaction between the water and the nanoparticles.

The following composition corresponds roughly to the following material composition of the nanoparticles present after milling the soil particles by the present method (by weight): Silicon (Si): 53% (quartz+other minor materials); Iron (Fe): 5% (iron oxides); Aluminum (Al): 25% (feldspar+ clay minerals); and Titanium (Ti): 17%.

The nanoparticles of silicon produced by the present method may undergo the following reaction: $Si+4H_2O \rightarrow Si(OH)_4+2H_2$. Hydrogen gas is therefore released. The silanol functional groups (Si—OH) of the orthosilicic acid ($Si(OH)_4$) may then form siloxane bonds (Si—O—Si) and release water: $2Si(OH)_4 \rightarrow (OH)_3Si\text{-}O\text{---}Si(OH)_3+H_2O$. Subsequently, the released water molecules may react with the silicon nanoparticles which have not reacted yet, sustaining the production of hydrogen gas until the silicon nanoparticles have been consumed: $4H_2O+Si \rightarrow Si(OH)_4+2H_2$.

Similarly, the aluminum, iron, and titanium can also react with water:

$$4Fe+6H_2O \rightarrow 4Fe(OH)_3+3H_2$$

$$2Al+6H_2O \rightarrow 2Al(OH)_3+3H_2$$

$$Ti+4H_2O \rightarrow Ti(OH)_4+2H_2$$

In addition to the aforementioned reactions, the metals and metal particles that are present or obtained in the colliding process may also undergo the following reactions:

$$Si+2H_2O \rightarrow SiO_2+2H_2$$

$$Ti+2H_2O \rightarrow TiO_2+2H_2$$

$$2Fe+3H_2O \rightarrow Fe_2O_3+3H_2$$

$$2Al+3H_2O \rightarrow Al_2O_3+3H_2$$

In embodiments, carbon dioxide may be introduced into the mechanical mill. The introduction of carbon dioxide may further cause a water-gas shift reaction to take place:

$$CO_2+H_2O \rightarrow CO+H_2$$

This reaction is particularly possible because the temperature in the mechanical mill may be raised by collision of particles with each other. Temperatures may be reached at which the water gas shift reaction can occur and be sustained.

The introduction of carbon dioxide may thus further the generation of hydrogen gas.

In the case of contaminated water, such as water contaminated with hydrocarbons, many further reactions may take place, including the generation of syngas. In yet further embodiments, water with a dispersion of salts may be used, or alkaline water or acid water. If soil particles other than sand are used, the chemical reactions that can occur will depend on the composition of the soil.

In embodiments, the method can include collecting the hydrogen produced from the mechanical mill. In embodiments, the method can include collecting the nanoparticles produced from the mechanical mill. In embodiments, the present method can combine harvesting of nanomaterials with the production of hydrogen. A mechanical mill as used throughout the present application may be regarded as any device capable of reducing the size of particles and compounds, particularly nanoparticles, using mechanical friction and collision. The following embodiments describe mechanical mills which can be used in the present method.

Mechanical Mills

In embodiments, the mechanical mill may be a ball mill. Any known or non-conventional mechanical mill may be used, including also known or non-conventional ball mills. The efficiency and effectiveness of the method will depend on the effectiveness of the mechanical mill to reduce the size of the sand particles.

In embodiments, the core may include a first disc and a second disc facing the first disc in an axial direction, and wherein the first disc and/or second disc are rotated, and each of the first and second discs can include: a plurality of concentric rings, a plurality of concentric channels alternately interleaved with the plurality of concentric rings, and the first disc and the second disc include a plurality of holes extending from the concentric channels and the concentric rings at an angle of between 2° and 89° with respect to the axial direction. The concentric rings of the first disc are arranged facing the channels of the second disc and the concentric rings of the second disc are arranged facing the channels of the first disc.

In other embodiments, the core can include a first cylinder having a radially outer surface and a radially inner surface and a second cylinder having a radially outer surface and a radially inner surface and wherein the second cylinder radially surrounds the first cylinder, and the first cylinder and/or second cylinder are rotated. The first cylinder can include a plurality of first through holes extending from the radially inner surface to the radially outer surface of the first cylinder, and the second cylinder can include a plurality of second through holes extending from the radially inner surface to the radially outer surface of the second cylinder, and the first and second through holes have a smaller cross-section at the radially inner surface than at the radially outer surface of the respective cylinder.

In yet further embodiments, the mechanical mill can include a core for accelerating the material and colliding particles of the material to produce smaller particles, wherein the core can include a first disc and a second disc facing the first disc, and wherein the first disc and/or the second disc are rotated. The first disc and second disc each include a plurality of concentric rings, wherein each ring can include a blade base and a plurality of hypersonic blades arranged on the blade base and a plurality of concentric channels alternately interleaved with the plurality of concentric rings. The hypersonic blades include a sharp leading edge, a sharp trailing edge and a suction surface and pressure surface configured to produce an expansion wave, wherein the hypersonic blades of the plurality of concentric rings of the first disc are arranged in the channels of the second disc and wherein the hypersonic blades of the plurality of concentric rings of the second disc are arranged in the channels of the first disc. Such a mechanical mill has been described in more detail in pending European Patent Application No. 23382949, which was filed on Sep. 19, 2023, and is hereby incorporated by reference herein in its entirety.

In embodiments, accelerating the water and the soil particles causes a cavitation effect, and changing a flow direction of the water causes a water hammer effect. Such effects have been found to be very effective and efficient for the production of nanoparticles from sand particles, and thus can be effective for the production of hydrogen as well.

In the following embodiments, several systems including different types of mechanical mills are described which may be used to carry out the methods described herein.

FIGS. 1A-1F schematically illustrate a first example of a mechanical mill that may be used in embodiments of the present disclosure. With respect to the functioning of the example of the mechanical mill of these figures, reference is made particularly to the use of sand, and more specifically desert sand. It should be clear however, that in other embodiments, other soil particles may be used.

FIG. 1A schematically illustrates a side and an exploded view of an example of a core 10 for accelerating and colliding material with itself for producing particles, in particular nanoparticles. Such a core may be used in methods according to the present disclosure.

The core 10 can include a first disc 11 including hypersonic blades and a second opposite disc 12 including hypersonic blades. In this example, the core 10 further can include a first supporting element 13 for supporting the first disc 11 and a second supporting element 14 for supporting the second disc 12.

The core 10 further can include a housing 15 enclosing at least the first disc 11 and the second disc 12. The housing 15 may form a chamber in which the first disc 11 and the second disc 12 are arranged. The first and second supporting elements 13, 14 may be configured to connect with a corresponding portion of the housing 15. Although in the example of this figure a disc is provided as a separate piece from a corresponding supporting element, in other embodiments they may be integrally formed, or any suitable support for the first disc 11 and second disc 12, as well as any suitable coupling between them and a shaft and/or the housing 15 may be provided.

The discs 11, 12 including hypersonic blades and a supporting element 13, 14 may form a rotor. In embodiments, a disc 11, 12 including hypersonic blades and a supporting element 13, 14 may form a stator. At least one the discs 11, 12 including blades may be rotatable. Both discs may be rotatable, or one of the discs may be rotatable. If both discs are rotatable, they may be rotated in a same direction or in opposite directions.

The pairs of discs 11, 12 including hypersonic blades and the supporting elements 13, 14 may be directly or indirectly connected to a corresponding shaft. In embodiments, connection of the discs to corresponding shaft may be through a hydraulic coupling system or a magnetic coupling system. Bearings such as ceramic bearings may be provided. A drive may be provided for rotating the shaft, and therefore rotating the corresponding disc and the hypersonic blades thereof. In embodiments, one or more electric motors may be provided. The motors may be AC motors, brushless DC electric motors, or in general any suitable motors for rotating the shaft. Other suitable actuators for rotating the shaft at high speed may alternatively be provided. The one or more drives and may be arranged outside the core 10 and the coupling may be magnetic in preferred embodiments so as to avoid any contamination.

In the example of FIG. 1A, the first disc 11 and the second 12 disc are arranged in a vertical configuration (rotation about a vertical axis). In other embodiments, the first 11 and second 12 discs may be arranged in a horizontal configuration (rotation about a horizontal axis), or in a different configuration.

Figure 1B:
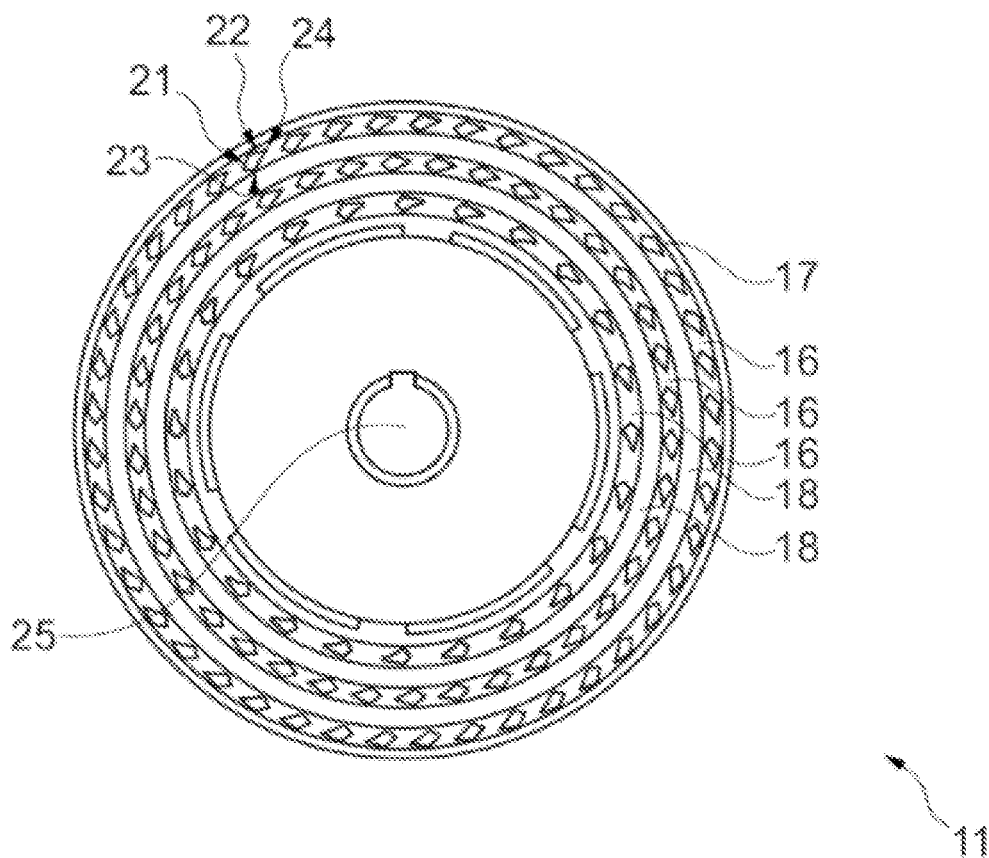

FIG. 1B schematically illustrates a bottom view of the first disc 11 including the hypersonic blades. The first disc 11, and also the second disc 12, include a first plurality of concentric rings 16. Each ring 16 can include a blade base and a plurality of hypersonic blades 17 arranged on the blade base configured to suck material to be accelerated and collided with itself. The first disc 11, and also the second disc 12, further include a second plurality of concentric channels 18 alternately interleaved with the first plurality of concentric rings 16. A central opening 25 through which material can be sucked into the core 10 when the first disc 11 and/or the second 12 disc are rotated can also be seen in this figure.

Figure 1C:
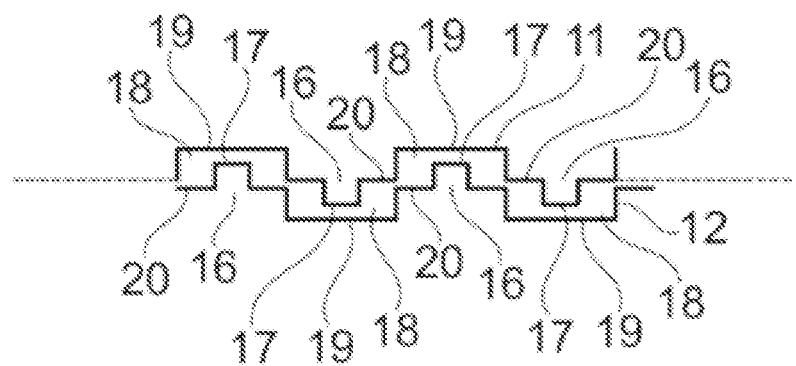

FIG. 1C schematically illustrates a cross-section of an example of the first disc 11 and the second disc 12 facing each other. The cross-section is taken in a plane which can include the axial and radial directions of the core 11. As can be seen in this figure, the channels 18 alternate with the blade rings 16 in each disc. Also, the channels 18 of a disc surround at least in part the hypersonic blades 17 of the other disc. Each channel 18 can include a channel base 19, and the channel bases 19 are offset from the blade bases 20 along an axial direction of the core 10. A side wall of a blade ring 16 and a side wall of a channel ring 18 may be shared, that is, a single wall may form the side wall of blade ring 16 and of blade ring 18. A channel 18 may have a U-shape or hat-shape, in embodiments.

As can also be seen in FIG. 1C, the hypersonic blades 17 of the first plurality of concentric rings 18 of the first disc 11 are arranged in the channels 18 formed by the second plurality of concentric rings of the second disc 12 such that the channels 18 formed by the second plurality of concentric rings surround at least in part the hypersonic blades 17 of the first plurality of concentric rings 16. Similarly, the hypersonic blades 17 of the first plurality of concentric rings 16 of the second disc 12 are arranged in the channels 18 formed by the second plurality of concentric rings of the first disc 11 such that the channels 18 formed by the second plurality of concentric rings surrounds at least in part the hypersonic blades 17 of the first plurality of concentric rings 16.

The hypersonic blades 17 may be integrally formed with the portion of the disc supporting them, or they may be formed separately, and then attached to the corresponding portion of the disc.

A gap (in an axial direction) between the two discs 11, 12 may be set as appropriate. In embodiments, such a gap may for example be between 1 micron and 2 mm, for example between 200 microns and 2 mm, or any value contained within a range formed by any two of the preceding values. In embodiments, a gap of 500 microns may be used.

Back to the example of FIG. 1B, the hypersonic blades 17 include a sharp leading edge 21, a suction surface 22, and a pressure surface 23 with a sharp transition point and a sharp trailing edge 24. This shape helps to suck the input material between the first 11 and second discs 12 when at least one of the discs is rotated. A shape and size of the blades 17 in a blade ring 16 may be the same, but the shape and/or the size of the blades 17 may vary between blade rings 16 In embodiments. The shape, pitch, chord length, and other variables of the blades may be optimized in each ring for the local conditions such as with increasing distance to the center, the speed of movement of the blades will increase.

The leading edges 23 of the hypersonic blades 17 of the first disc 11 may point in a same circumferential direction of the first disc 11. The leading edges 23 of the hypersonic blades 17 of the second disc 12 may point in the opposite circumferential direction: in this example, the discs with blades are rotated in opposite directions.

Also, a chord length of the blade (that is, the length between the leading edge 23 and the trailing edge 24) of the hypersonic blades 17 of a ring 18 of the first disc 11 may decrease from a most radially inner ring towards a most radially outer ring of the first disc 11. Similarly, a length between the leading edge 23 and the trailing edge 24 of the hypersonic blades 17 of a ring 16 of the second disc 12 may decrease from a most radially inner ring towards a most radially outer ring of the second disc 12.

A pitch, that is, a distance along the circumferential direction between leading edges of two consecutive blades, may increase from a most inner ring towards a most outer ring of the first disc 11 in a radial direction of the first disc 11. The same may apply to the blades of the second disc.

Figure 1D:
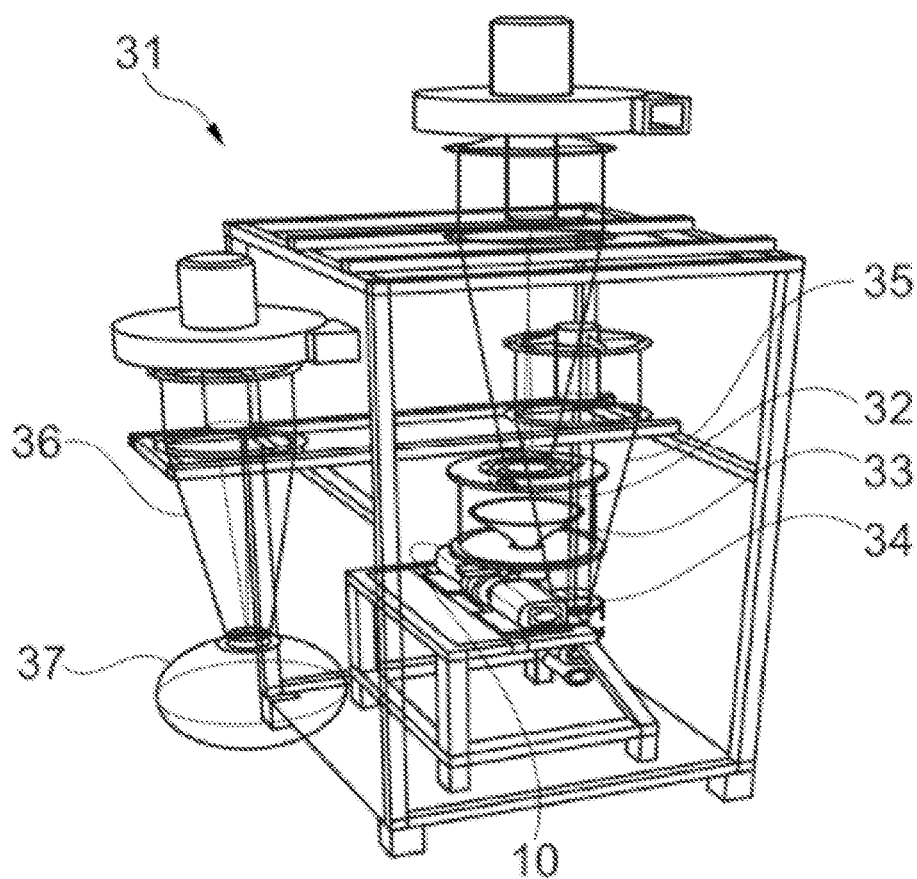
Figure 1E:
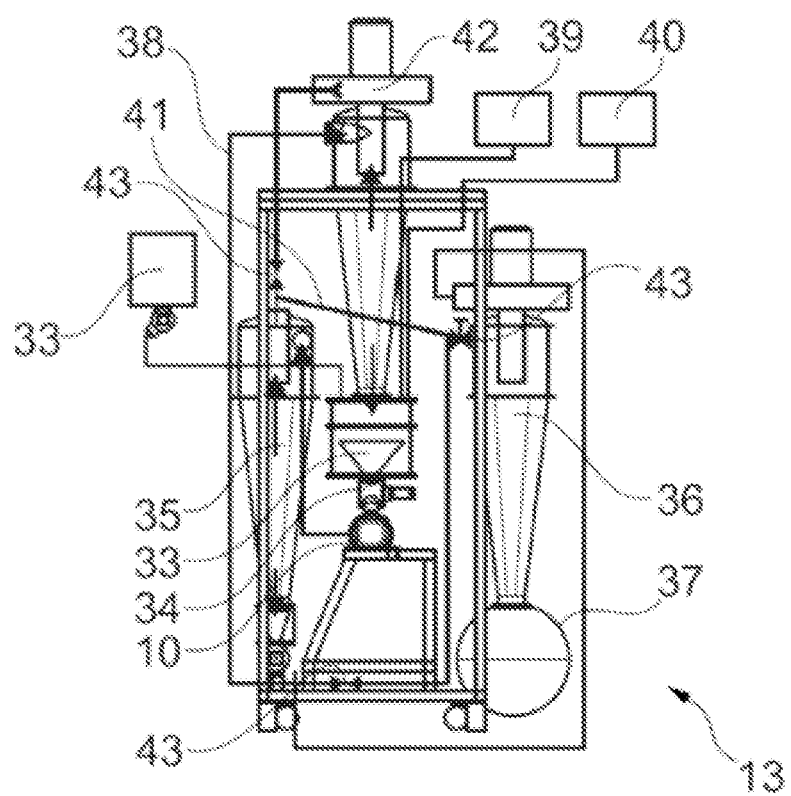

In embodiments, the first disc 11 and the second disc 12 may include or may be made of a ceramic material. This can include the blades 17, which may include or be made of a ceramic material. The core 10 may be incorporated in an apparatus. According to a further aspect, an apparatus for the generation of hydrogen and obtaining nanoparticles is described. An example of an apparatus is provided in FIGS. 1D and 1E. FIG. 1D schematically illustrates a perspective view of an apparatus including a core according to the example of FIGS. 1A-1C. FIG. 1E schematically illustrates a front view of the apparatus of FIG. 1D.

The apparatus 31 can include a core 10 as described throughout this disclosure, an inlet 32 for introducing the sand (or mixture of sand particles with water) in the apparatus, and in particular in a path of the apparatus through which the material may travel, as shown in FIG. 1D. The apparatus 31 further can include one or more elements connecting the inlet 32 and the core 10. As can be seen in FIG. 1E, a material source 32 may supply the desert sand or mixture of desert sand with water to be introduced in the apparatus such that the material can reach the core 10.

The apparatus 31 may include a hopper 33 in the case sand particles are supplied separately from the water. The hopper may hold the sand introduced in it which is to be collided and may then dispense it. The apparatus 31 may be configured to dose the material to be introduced in the core 10. Any suitable dosing system may be used. For example, a roto valve may be used.

The apparatus may include a system 39, 40 for setting an atmosphere within a path of the apparatus through which the material is to travel. For example, the system may be configured to introduce a fluid in the apparatus for modifying an atmosphere within the apparatus. In particular, the introduction of carbon dioxide is proposed herein.

In the example of FIG. 1E, an element 40 for delivering a fluid and a vacuum pump 39 have been represented. In this example, the element 40 for delivering a fluid and a vacuum pump 39 are fluidly connected to the hopper 33.

The apparatus 31 may also include one or more actuators for rotating at least one of the first disc 11 and the second disc 12. An actuator may for example be a motor.

The apparatus 31 may include a system for generating an under pressure for removing collided material from the core 10. In particular, the system may be configured to create an underpressure in an outlet of the core 10. Besides helping to remove the collided material from the core 10, such an under pressure may also help to reduce friction with the core 10 and reduce collisions between the material and the hypersonic blades 17.

The apparatus 31 may include a system 35 for separating the nanoparticles from a surrounding medium. An example of such a system may be a cyclonic separator. A cyclonic separator may remove the collided material from a fluid such as a hydrogen gas. This may be achieved through gravity and rotational effects. System 35, such as a cyclonic separator, may be configured to separate material by size or density In embodiments. The obtained particles may have different sizes, and the system 35 may separate the collided material in two or more groups according to, for example, size of the components of the material. In embodiments, the system 35 for separating the collided material from a surrounding medium and the system for generating an under pressure for removing the collided material from the core 10 may be the same.

The collided soil particles may include a portion of nanoparticles which have a desired size and are therefore ready to be collected. The collided soil particles may also include a portion of nanoparticles or material of a larger size which have not yet reached the desired size. In embodiments, the nanoparticles which are of a desired size may be directly removed from the apparatus 31. In other embodiments, the apparatus 31 may include a system 36 configured to collect the nanoparticles which have reached a desired size. Such a system 36 may include an element configured to suck the nanoparticles towards an inside of the system 36. The nanoparticles may for example go from the cyclonic separator to the collection system 46, see arrow 41 in FIG. 1E. The system 36 may include a storage element 37, from which the nanoparticles may be removed. In embodiments, the storage element 37 may be removable from the collecting system 36.

The portion of the collided material which has not reached a desired sized may be directed to the core 10 to be collided again, see arrow 38 in FIG. 1E. The apparatus 31 may be configured to this end. For example, a turbo blower 42 may help to remove the corresponding collided material and guide it towards the core 10. The medium surrounding the collided material may also be directed to the core 10 after it has been separated from the collided material. One or more turbo blowers may be connected to the system 35 for separating the collided material from a surrounding medium In embodiments.

A plurality of valves 43 can also be seen in FIG. 1E. The valves may regulate the passage of a fluid through a path of the apparatus.

Figure 1F:
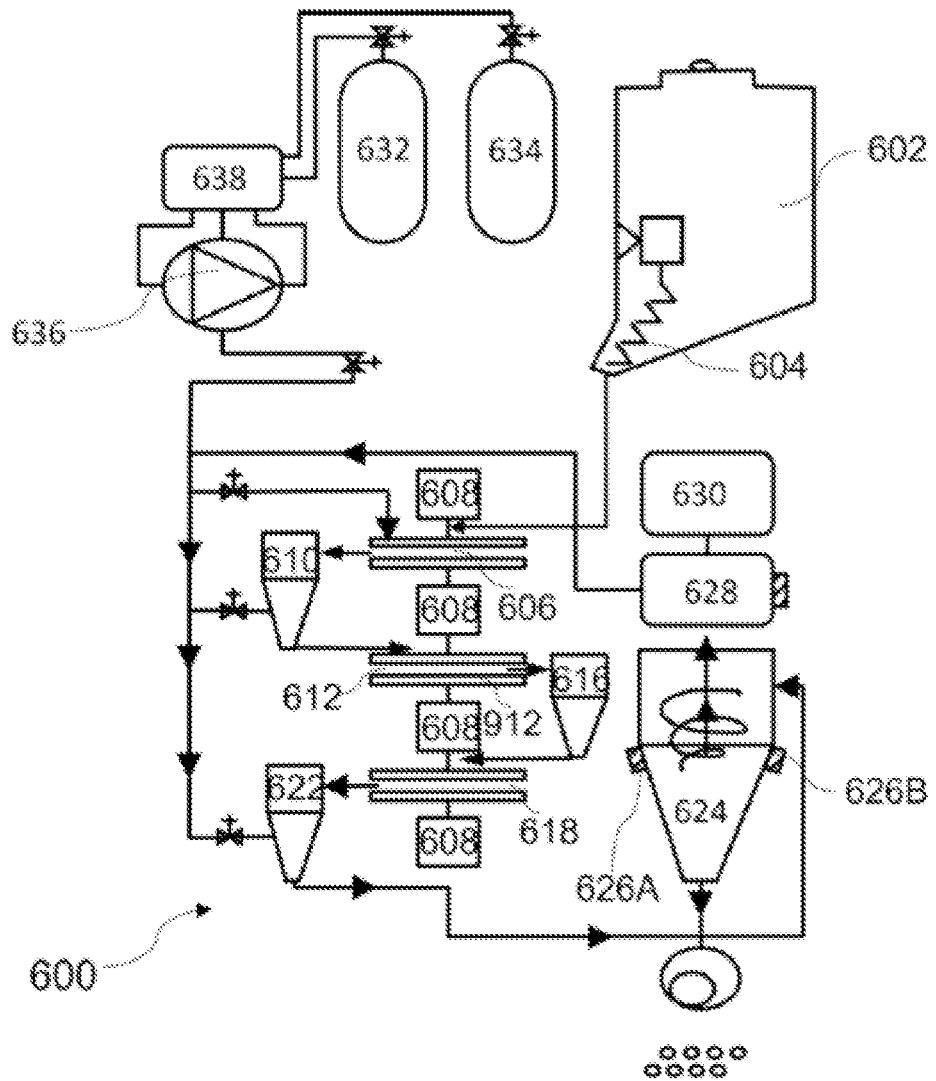

An apparatus may include more than one core. FIG. 1F schematically illustrates an example of an apparatus 600 which can include a plurality of cores, in particular three cores. Therefore, three stages may be provided: at the first stage, the input material (sand) is introduced into a first core 606. Once collided, it is introduced into a first cyclonic separator 610. At the second stage, the collided material from the first stage which has been separated from the surrounding medium is introduced into a second core 912. The collided material is then passed through a second cyclonic separator 616. And at the third stage, this material is introduced into a third core 618. The collided material in the third core 618 is separated from a surrounding medium once more in a third cyclonic separator 622. In the example of FIG. 1F, a plurality of actuators 608 such as electric motors are used for rotating the first and second discs of each core 606, 912, 618.

The apparatus 600 may include or may be connected with a storage container 602 that stores an input material, for example sand or other soil. The input material may be delivered through a screw dozing system 604 into the first core 606 along with a surrounding medium, such as a gas.

The apparatus 600 may further include a fourth cyclonic separator 624 and a plurality of ultrasound generators 626A, 626B provided with the fourth cyclonic separator 520. When the particles outputted from the third cyclonic separator 622 travel through the fourth cyclonic separator 624, the ultrasound generated by the ultrasound generators 626A, 626B help to palletize the produced particles. A pallet may have dimensions of a few microns, for example, a length of a pallet may be below 20 microns, in embodiments. A plurality of pallets may be stored in a cartridge.

The apparatus 600 may further include a turbo blower 628 for creating an under pressure on the fourth cyclonic separator 624 and drawing the particles from the separator 624, such that they may be directed towards the first core 606 if an obtained particle size is bigger than a desired particle size. An actuator 630 such as an electric motor may be provided of operating the turbo blower 628.

The apparatus 600 may further include one or more tanks containing, for example, carbon dioxide, carbon monoxide, or other gas. The vacuum pump 636 may be provided to deprive the entire system of air.

The apparatus 600 may further include a plurality of sensors, for example flow sensors, temperature sensors, humidity sensors, pressure sensors and rotational speed sensors. The operation of the sensors may be controlled using a sensor control system. A control unit may control the operation of the apparatus 600 during the production of particles based on real-time data obtained by the sensors.

Aspects of the apparatus of FIG. 1F may be applied and combined with the apparatus of FIGS. 1D and 1E, and vice versa. For example, one or more ultrasound generators may be included in the apparatus of FIGS. 1D and 1E for palletizing the produced particles.

Figure 2A:
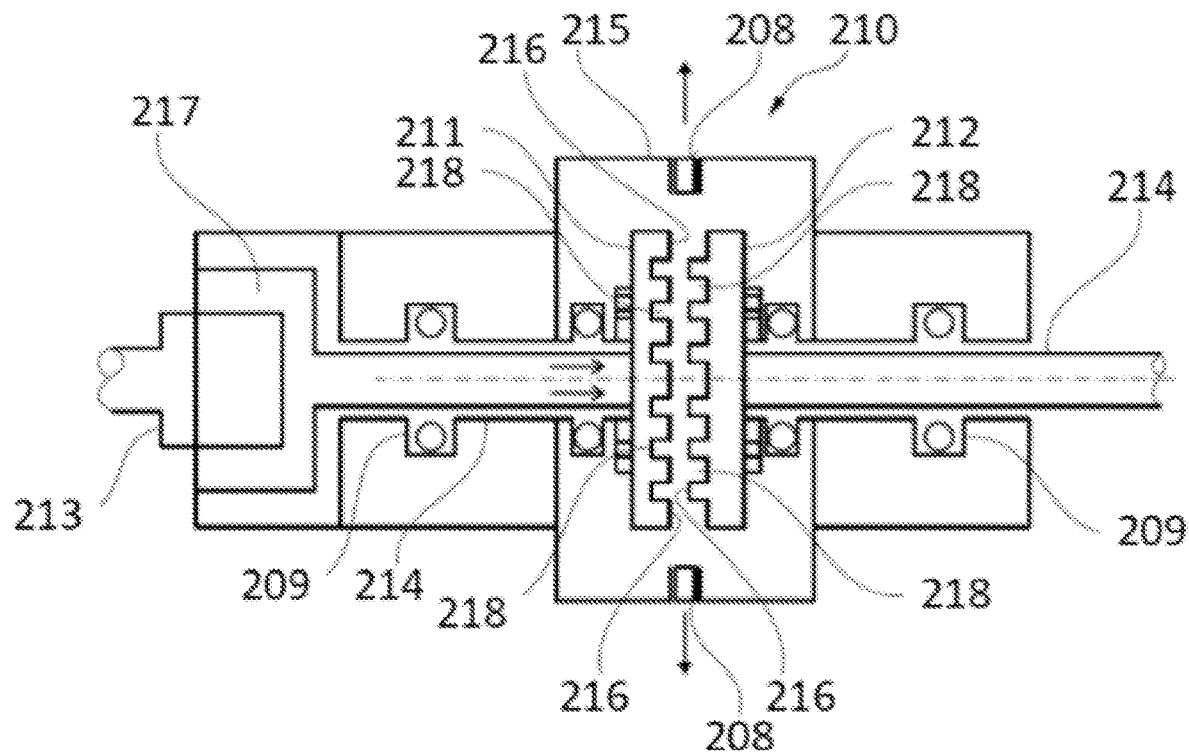
FIGS. 2A-2E schematically illustrate further embodiments of mechanical mills that may be used in embodiments of the present disclosure.

FIG. 2A schematically illustrates a cross-sectional view of another example of a core 210 for accelerating a working liquid including a solid material, colliding the material with itself, achieving the water hammer effect and the cavitation effect, and producing nanoparticles. Such a core may be used in an apparatus for producing nano particles and for producing hydrogen gas. The cross-section is taken in a plane which can include the axial and radial directions of the core.

The core 210 can include a first disc 211 and a second opposite disc 212 facing the first disc 211 in an axial direction. The apparatus in which the core 210 is included can include one or more drives 213 for rotating the first disc 211 and/or the second disc 212. In the example of this figure, a single drive 213 is illustrated, but another drive for rotating the second disc 212 may also be provided.

The first disc 211 and the second disc 212 include a plurality of concentric rings 216. The first disc 211 and the second disc 212 further include a plurality of concentric channels 218 alternately interleaved with the plurality of concentric rings 216. The first disc 211 and the second disc 12 include a plurality of holes (not shown in this figure, see for example FIGS. 2B and 2E) extending from the concentric channels 218 and the concentric rings 216 at an angle of between 2° and 89° with respect to the axial direction, and specifically between 1° and 80° with respect to the axial direction, and more specifically between 20° and 70° with respect to the axial direction.

The concentric rings 216 of the first disc 211 are arranged facing the channels 218 of the second disc 212. The concentric rings 216 of the second disc 212 are arranged facing the channels 218 of the first disc 216.

Figure 2B:
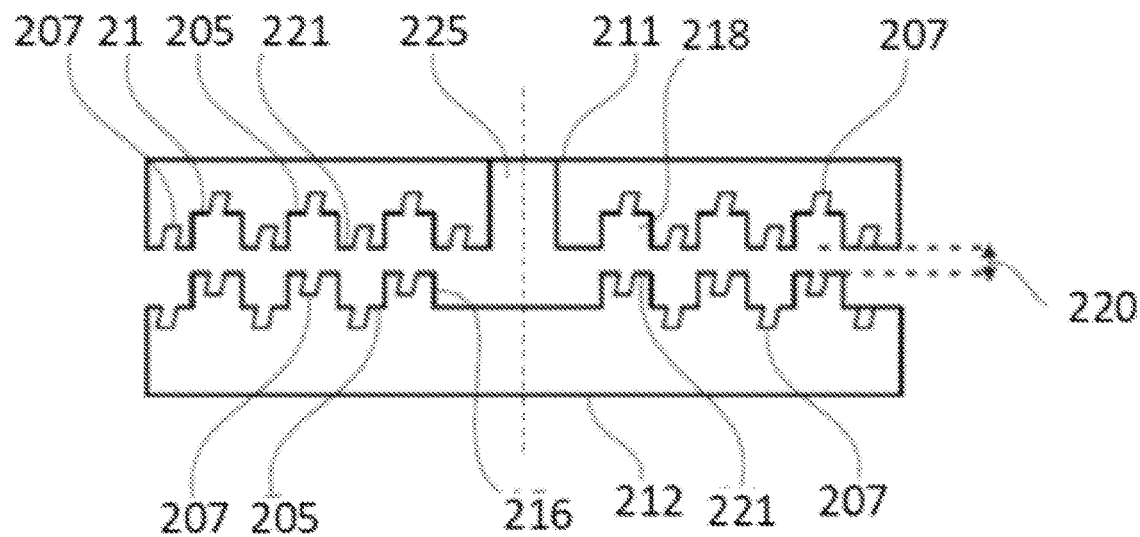

A gap in an axial direction may be provided between a base of the rings of one disc and a base of the rings of the other disc, see also FIG. 2B. Such a gap may for example be less than 500 microns.

The core can include one or more inlets through which the water containing the sand, or the sand and the water separately, may be introduced.

The core 210 further can include a housing 215 enclosing at least the first disc 211 and the second disc 212. The housing 215 may form a chamber in which the first disc 211 and the second disc 212 are arranged. Any suitable coupling between the discs 211, 212 and a shaft 214, and between the discs 211, 212 and the housing 215 may be provided.

At least one the discs 211, 212 may be rotatable. Both discs may be rotatable, or one of the discs may be rotatable. If both discs are rotatable, they may be rotated in a same direction or in opposite directions. In the specific disclosed example, both discs are rotated in opposite directions. The objective of the rotation of the disc(s) is to produce a water hammer effect and to create cavitation, and to make the working material (water and dispersed or dissolved sand particles) collide. The collision, shock waves and low pressure areas due to cavitation can break down the sand particles, and raise the temperature of the water and convert the water to gas/steam/vapor.

The drives may be directly or indirectly connected to a corresponding shaft 214. In embodiments, connection to a corresponding shaft may be through a hydraulic coupling system, a pneumatic system or a non-contact system such as a magnetic coupling system. In the example of FIG. 2A, a magnetic coupling 217 is provided between the drive 213 and the shaft 214. Bearings 209, for example ceramic bearings, may be provided. A drive 213 may be provided for rotating the shaft 214, and therefore rotating the corresponding disc.

In embodiments, the drive 213 may be an electric motor. The motor may be an AC motor, a brushless DC electric motor, or in general any suitable motor for rotating the shaft 214. Other suitable actuators for rotating the shaft 214 at high speed may alternatively be provided. In embodiments, a gas turbine, an air turbine or a steam turbine may be used for driving the rotation. The one or more drives 213 may be arranged outside the core 210 and the coupling with the shaft 214 may be a non-contact coupling, for example magnetic, so as to avoid or at least reduce any contamination of the drive 213.

In the example of FIG. 2A, the first disc 211 and the second 212 disc are arranged in a horizontal configuration (rotation about a horizontal axis, the axial direction is parallel to a horizontal direction). In other embodiments, the first 211 and second 212 discs may be arranged in a vertical configuration (rotation about a vertical axis), or in a different configuration.

In the example of FIG. 2A, the first disc 211 can include a central opening through which material can be introduced into the core 210. The second disc 212 does not include such an opening in this example, but it may include it in other embodiments. In FIG. 2A, the core 210 can include two exits 208 for the working liquid. In particular, the working liquid may be output along a radial direction of the core. In other embodiments, more or less exits may be provided, and the exits may be provided in any suitable location of the housing of the core.

FIG. 2B schematically illustrates a cross-section of an example of the first disc 211 and the second disc 212 facing each other. The rings 216 and the channel portions 205 of the discs 211, 212 include holes 207. In this example, the holes 207 are blind holes. The holes 207 are also inclined with respect to the axial direction. The first disc 211 can include a central opening 225 through which the working liquid is to be introduced between the first disc 211 and the second disc 212.

The rings 216 include a ring base 221 and side walls. The holes 207 open in the ring bases 221. The channels 218 include a channel base 219 and side walls. The channel bases 219 of a disc are offset from the ring bases 221 of the disc along an axial direction of the disc, and therefore the core 210. A side wall of a ring 216 and a side wall of a channel 218 may be shared, that is, a single wall may form the side wall of the ring 216 and of the adjacent channel 218.

The ring bases 221 of the first disc 211 are offset from the ring bases 221 of the second disc 212 along the axial direction of the discs. The gap 220 between both discs may be set appropriately for operation. The size of the gap 220 may for example be set depending on the material to be processed, the size of this material and the desired material after processing. In embodiments, the gap 220 may be between 420 and 1000 microns. If the apparatus includes a plurality of cores, a gap 220 between a pair of discs may reach 4 mm, such as for the first pair of discs through which the material is passed through.

Figure 2C:
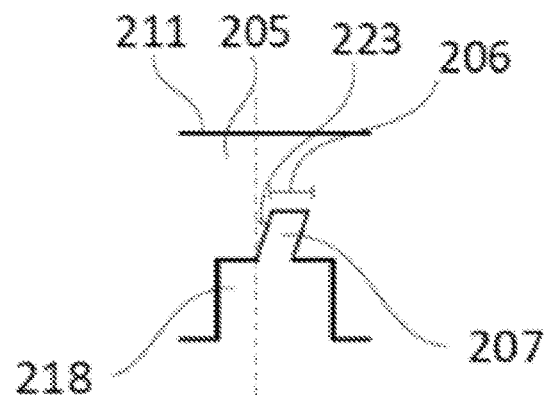

FIG. 2C schematically illustrates an enlarged view of a channel portion 205 and a channel 218 of the first disc 211. The hole 207 forms an angle 223 with respect to the axial direction. In general, the holes 207 of the discs form an angle between 2° and 89° with the axial direction. An angle 223 between 20° and 80°, and specifically between 25° and 75°, such as about 72°, may be particularly suitable for achieving and enhancing the water hammer and cavitation effects. The angle 223 chosen may depend on the size of the material to be introduced in the core of the apparatus, on the desired size of the material after processing as well on the specific material to be processed.

The holes may have a substantially elliptical cross-section. This cross-section refers to a cross-section perpendicular to the axial direction of a disc. An elliptical cross-section of the holes 207 may be particularly suitable for achieving and enhancing the water hammer and cavitation effects.

Other shapes of a cross-section of a hole 207 may be possible. For example, a cross-section of a hole 207 may be oval, elliptic, oblong, or circular.

In embodiments, blind holes 207 may have a depth of between 2 mm to 12 mm. The blind holes 207 may, in embodiments, be cone-shaped or semi-spherical. A radius of the blind holes 207 may be greater than or equal to 2 mm. The dimensions of the blind holes, and in general of the holes regardless of whether they are blind or not, may depend on the size (diameter and thickness) of a disc. Therefore, the dimensions of the holes may vary for discs having different sizes.

In embodiments, a cross-section, such as in a cross-section perpendicular to the radial direction, the inner dimensions of the hole 207, such as a width 206 of a hole 207, may be constant throughout its length, see for example FIGS. 2B and 2C. The walls defining a hole 207 may be straight. In other embodiments, a size, such as a width 206 of a hole 207, may decrease. For example, a size of the holes 207 of the first 211 and/or the second disc 212 may decrease from a most radially inner portion towards a most radially outer portion of the respective disc.

In general, the shape and dimensions of the holes 207 may be adapted to the working liquid to be used, and in particular to the type and size of the sand particles mixed with the working liquid.

The shape and internal dimensions of the holes 207, an angle of inclination of the holes 207 with respect to an axial direction and a pitch between the holes of a same ring 216 or channel portion 205 may be adapted for each ring 216 and channel portion 205. In particular, these parameters may be varied taking into account that a speed of a hole increases with an increasing distance to the center of the disc. For example, a pitch of the holes 207 of the first 211 and/or the second disc 212 may increase from a radially most inner portion towards a radially most outer portion of the respective disc.

Also, a size of the holes (in particular in cross-section, such as an internal radius of the hole) of the first 211 and/or the second disc 211 may decrease from a most radially inner portion towards a most radially outer portion of the respective disc.

Figure 2D:
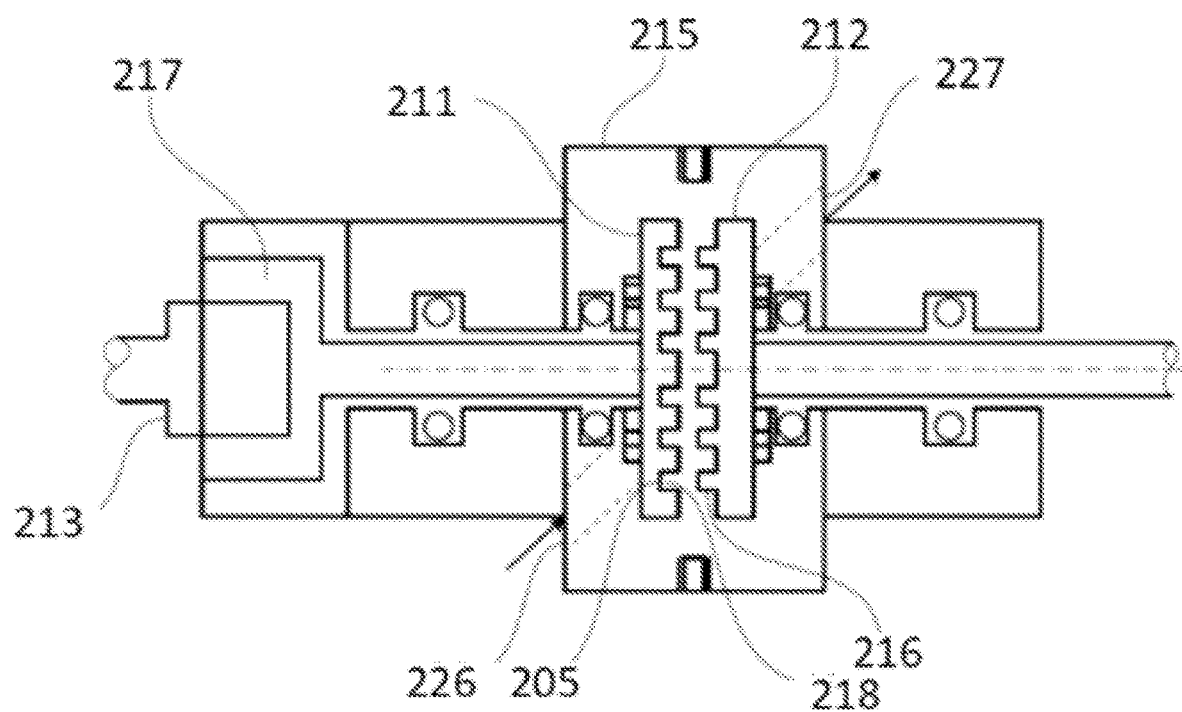

FIG. 2D schematically illustrates a cross-sectional view of another example of a core 210. In this example, the holes are through holes such that the working liquid can flow axially through the first disc 211 and the second disc 212. The working liquid (for example, water) may be introduced into the core 210 through a portion of the housing 215. For example, the housing may have an inlet 226 at an axial side of the housing for introducing the working liquid. The housing may have an outlet 227 at an opposite axial side of the housing for removing the working liquid with the material of a smaller size. As shown in the example of FIG. 2D, the inlet 226 and the outlet 227 may also be at opposite radial sides of the core.

Figure 2E:
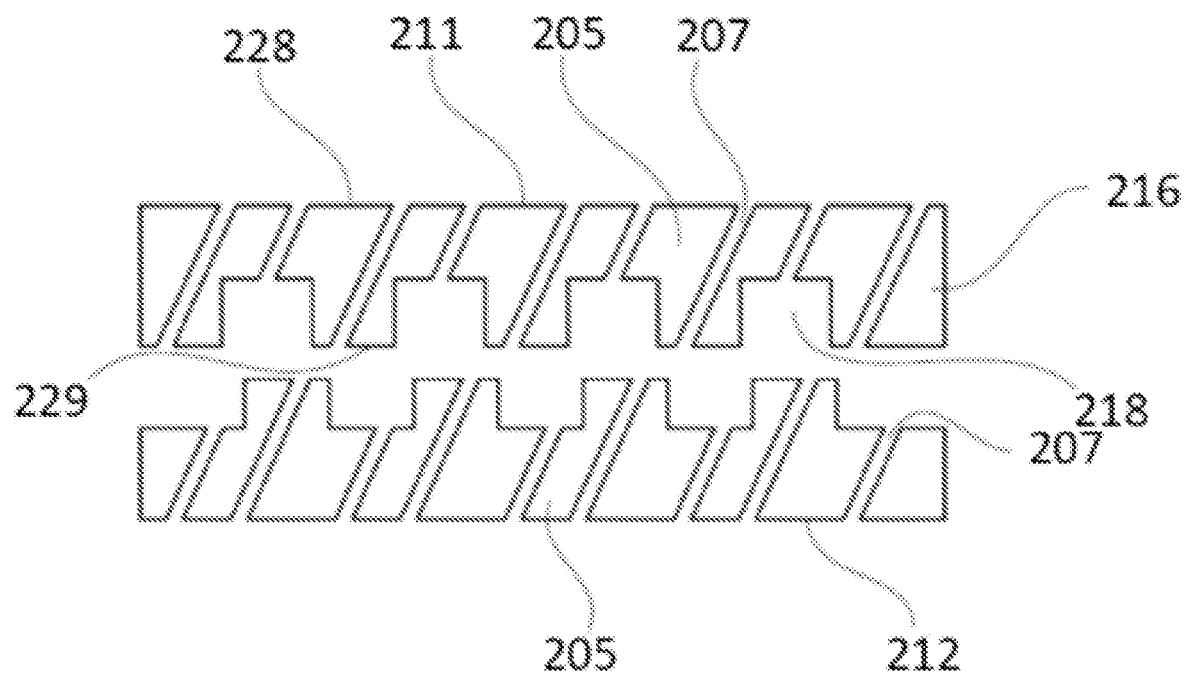

FIG. 2E schematically illustrates a cross-section of another example of a first disc 211 and a second disc 212 facing each other. The rings 216 and the channel portions 205 of the discs 211, 212 include holes 207. In this example, the holes 207 are through holes. Therefore, the holes extend from an axial surface 228 of a disc to an opposite axial surface 229 of the disc. The holes 207 are also inclined with respect to the axial direction.

Regardless of whether the holes 207 are blind holes or through holes, in some embodiments the first disc 211 and the second disc 212 may include or may be made of a ceramic material. The first and the second disc may be coated with a ceramic material In embodiments. This may help to operate with materials which may exhibit magnetism. The discs may have a disc body made of steel, such as stainless steel, and a ceramic coating. In other embodiments, other materials for the disc body and for a coating, if present, may be used. For example, a disc may include a wolfram carbide coating, in embodiments.

During operation, the core may reach high temperatures, for example temperatures above 100° C. A cooling system may be provided for cooling the core 210. For example, the housing may include conduits through which a suitable cooling fluid may be circulated.

The apparatus may be configured to generate hydrogen ($H_2$) inside it. In preferred embodiments, hydrogen gas and nanoparticles may be simultaneously produced. Colliding sand particles may activate the sand material and constituents thereof such that the produced nanoparticles are able to react with water molecules, in particular without adding a base such as potassium or sodium hydroxide (KOH and NaOH). Alkaline water may also be used, though is not required. A metallic material herein may include both metals (iron (Fe), aluminum (Al), calcium (Ca), magnesium (Mg), and the like) and metalloids (silicon (Si)). The oxidizable metallic material may further include a non-metallic element or compound. Additives may be added for improving the reaction between the sand constituents and the water. For example, if materials like silicon, graphene or activated carbon are added, this may help to improve the reaction between the material and the water. For example, the additives may include nano-sized activated carbon or graphene. An oxidizable material may herein be regarded as referring to a material which is capable of removing and capturing oxygen from a water molecule, such that hydrogen is produced in the process. Other additives that may be used are for example iron nanoparticles or nickel (Ni).

The use of nickel may help to weaken the bonds between the hydrogen and the oxygen of the water molecules by bonding with the hydrogen atoms of the water molecules. Nickel may therefore help to promote the reaction between the oxidizable material and the water molecules. Also, nickel may help to break the water molecules, the hydrogen atoms remaining attached to the nickel. Accordingly, the hydrogen production may also be enhanced.

Nickel may be introduced in the core in powder form, in embodiments. In other embodiments, nickel may be attached to an inside of the apparatus. For example, strips or other suitable elements including nickel, such as made of nickel or being coated with nickel, may be attached to the apparatus. A suitable location may be at the outlet of the core, such that the working liquid (water) with oxidizable material of smaller size after traveling through the core may be passed and contacted with the nickel.

Therefore, an oxidizable material may be collided for obtaining nanoparticles which may react with water, for example seawater, without the need to use further chemical elements or compounds. Such a reaction may effectively produce hydrogen. For example, if silicon is used, the nanoparticles of silicon produced may undergo the following reaction: $Si + 4H_2O \rightarrow Si(OH)_4 + 2H_2$. Hydrogen gas is therefore released. The silanol functional groups (Si—OH) of the orthosilicic acid ($Si(OH)_4$) may then form siloxane bonds (Si—O—Si) and release water: $2Si(OH)_4 \rightarrow (OH)_3Si-O-Si(OH)_3 + H_2O$. Subsequently, the released water molecules may react with the silicon nanoparticles which have not reacted yet, sustaining the production of hydrogen gas until the silicon nanoparticles have been consumed: $4H_2O + Si \rightarrow Si(OH)_4 + 2H_2$.

The other constituents of sand may likewise chemically react in accordance with the reactions previously described herein.

The chemical reactions above may cause the pH to decrease and a decrease in pH can increase the dynamics of the reaction. For example, decreasing a pH below 5 may help to speed up the process as well as to increase the reactivity of the Si nanoparticles.

However, this will depend on which additive(s) and in which amount are added (if added at all). It may also be possible that the pH increases In embodiments. In embodiments, an acidic solution, such as a solution including orthosilicic acid ($Si(OH)_4$), may be added to accelerate the process for generating hydrogen gas.

In embodiments, hydrogen may be produced in the separator system, for example in a centrifugal separator. The hydrogen may be collected from the top of the centrifugal separator and a remaining liquid may be collected from the bottom of the centrifugal separator. Remaining solid material and working liquid may be directed to the core. Hydrogen may also be produced in, and collected from, the core In embodiments.

Pressure waves generated within the working liquid due to the water hammer effect may rapidly change the speed of the working liquid and create turbulent flows. When the oxidizable material, such as silicon, is subjected to the pressure waves, the oxidizable material may break and mix effectively with the working liquid, enhancing contact between the oxidizable material and the water. The reaction between the oxidizable material and the water to produce hydrogen gas may be increased, as the oxidizable material would be well dispersed and exposed to the water molecules.

Also, the collapse of the bubbles formed in the working liquid generates localized regions of high pressure and temperature. This high temperature may help to trigger and accelerate the reaction between water and the oxidizable material. The bubble collapse also releases a high amount of energy in the form of shockwaves. This energy may also help to trigger the reaction between the oxidizable material and the water molecules. In embodiments, the following reaction may occur due to the high temperature and high pressure conditions: $Si+2H_2O \rightarrow SiO_2+2H_2$. Also, bubble collapse may help to break down the oxidizable material and to expose more surface available for reacting with water.

In addition, bubble collapse may generate strong hydrodynamic shear forces which may remove outer layers of the oxidizable material. The exposed inner layers may react more easily with the water molecules, enhancing the production of hydrogen gas.

Also, pressure waves and bubble collapse may increase the collisions between the oxidizable material, accelerating its rupture into smaller portions.

Water hammer and cavitation effects can work synergistically to create optimal conditions for hydrogen production. Water hammer may induce turbulent flows and mixing of the oxidizable material with water. This may prepare the water and the oxidizable material for receiving the shock waves produced by the bubble collapse. These shock waves may further enhance mixing and reactivity, creating a beneficial environment for efficiently generating hydrogen gas.

Figure 3A:
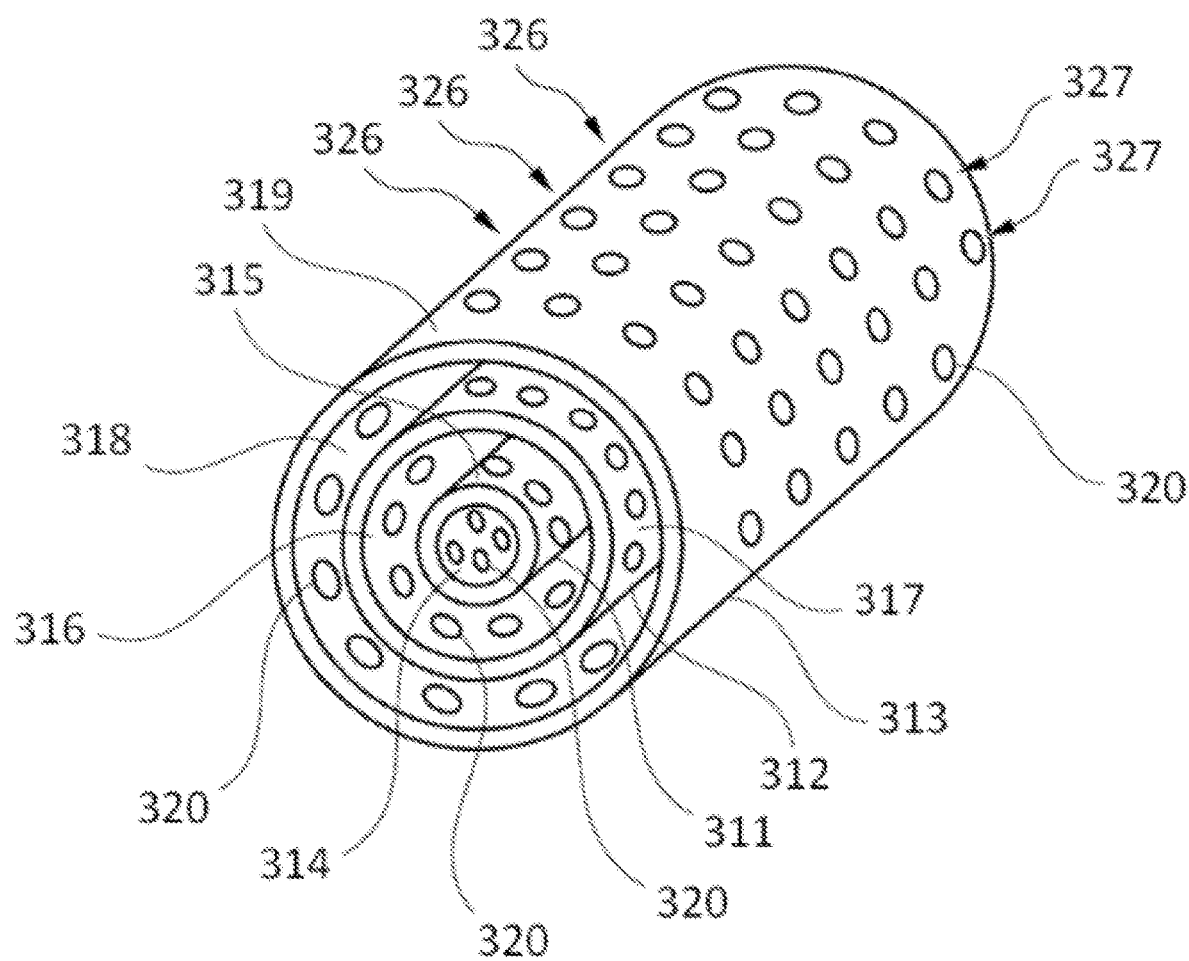
FIGS. 3A and 3B schematically illustrate a further example of a mechanical mill that may be used in embodiments of the present disclosure.
Figure 3B:
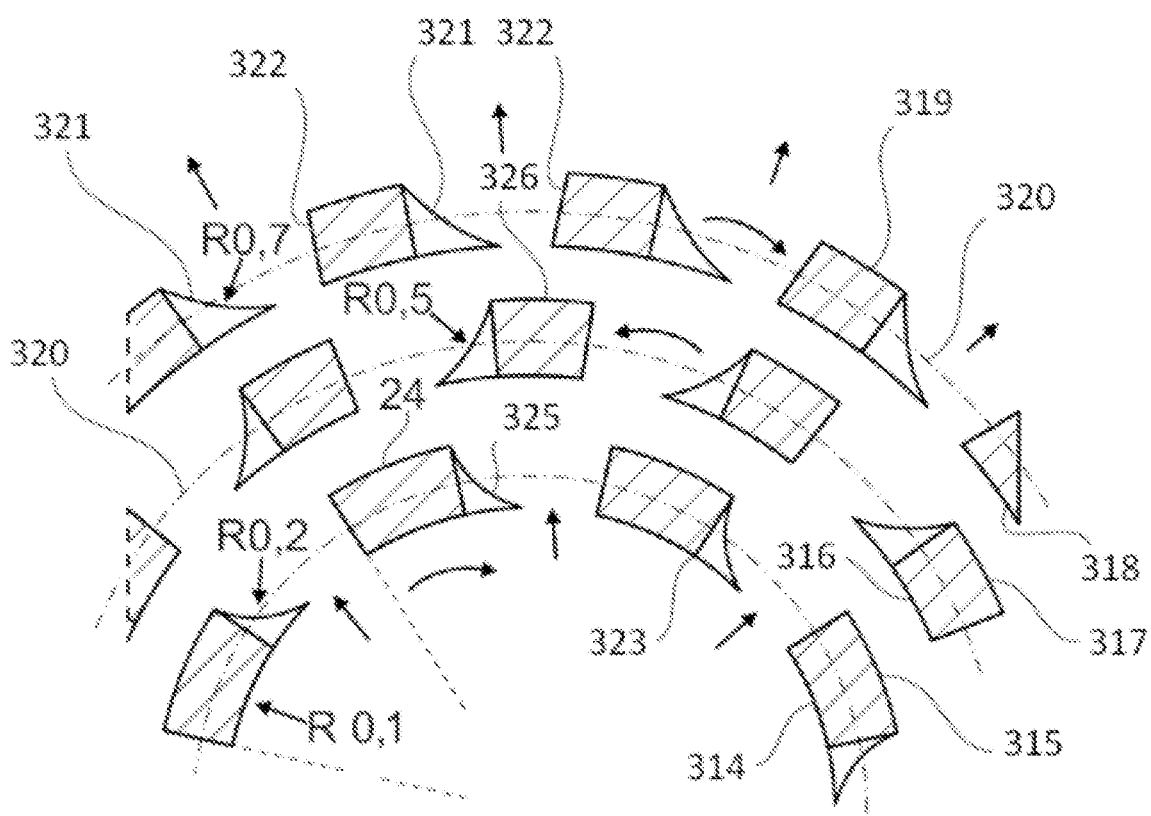

FIGS. 3A and 3B schematically illustrate yet a further example of a core for generating both nanoparticles and for the generation of hydrogen gas. FIG. 3A schematically illustrates a perspective view of an example of the cylinders of a core for accelerating a mixture of sea water with sand particles, colliding the sand with itself, achieving the water hammer effect and the cavitation effect, and producing nanoparticles.

The core can include a first cylinder 311 and a second cylinder 312 surrounding the first cylinder 311. In this particular example, the core further can include a third cylinder 313 surrounding the second cylinder 312. The first cylinder 311 has a radially outer surface 315 and a radially inner surface 314. Likewise, the second cylinder 311 has a radially outer surface 317 and a radially inner surface 316, and the third cylinder 313 has a radially outer surface 319 and a radially inner surface 318.

The first cylinder 311 and the second cylinder 312 include a plurality of through holes 320 extending from the radially outer surface 315, 317 to the radially inner surface 314, 316. The holes 320 increase in size from the radially inner surface 314, 316 to the radially outer surface 315, 317 (see FIG. 3B). Likewise, in this example, the third cylinder 313 can include a plurality of through holes 320 extending from the radially outer surface 319 to the radially inner surface 318, and the holes 320 increase in size from the radially inner surface 318 to the radially outer surface 319.

The core can include at least one inlet for introducing the water and sand (and other the material) into the core. The working liquid and the material may be introduced axially between the inner surface 314 of the first cylinder 311. The core can include one or more drives for rotating the first cylinder 311 and/or the second cylinder 312.

Therefore, at least one of the first cylinder 311 and the second cylinder 312 may be rotated for accelerating the working liquid with the solid material and cause the liquid and the solid material to travel radially outwards. The solid material may collide with itself, breaking down. Cavitation and water hammer effects may arise, which may help the solid material to break down due to shockwaves and bubble collapse, as well as to increase the collisions with itself due to increased turbulence.

As can be seen in FIG. 3A, the first cylinder 311 and the second cylinder 312 (and possible additional cylinders 313) are hollow cylinders separated in a radial direction by a small distance. The drawings are not to scale. The cylinders are arranged concentrically. In embodiments, a distance between two cylinders may be between 10 microns and 1 cm. The distance may be the same between all the adjacent cylinders. For example, a distance between the outer surface 315 of the first cylinder 311 and the inner surface 316 of the second cylinder 312 may be the same as a distance between the outer surface 317 of the second cylinder 312 and the inner surface 318 of the third cylinder 313. The distance between cylinders may be set depending on several aspects, for example on which liquid and solid are to be introduced in the core, the density of the working liquid, the amount of the solid material, and other factors.

FIG. 3B schematically illustrates an enlarged cross-sectional view of an example of three cylinders. The cross-section is taken perpendicular to the axial direction of the cylinders. The through holes 320 may be delimited by a first curved edge 321 and a second straight edge 322 in a cross-section perpendicular to an axial direction of the first cylinder 311 and the second cylinder 312 In embodiments. The curved edge 321 may be configured to direct the flow of the working liquid radially outwards and be configured to "scoop" the liquid and direct it radially outwards. The curved edge 321 may be concave, that is, the curved edge 321 may curve inwards.

In the example of FIG. 3B, the first cylinder 311 and the third cylinder 313 are configured to be rotated clockwise.

Therefore, the curved edges 321 face a clockwise direction. The vertex of the cylinder portions 323 at the radially inner surface 314, 318 point clockwise. The second cylinder 312 is to be rotated counterclockwise. Therefore, the curved edges 321 of the cylinder portions 323 of the second cylinder 312 face a counterclockwise direction. The vertex of the cylinder portions 323 at the radially inner surface 316 point counterclockwise. In this cross-sectional view, a cylinder portion 323 may include a first subportion 324 and a second subportion 325. The second subportion 325 can include the curved edge 321 delimiting a through hole 320, whereas the first subportion 324 can include the straight edge 322 delimiting another through hole 320.

In other embodiments, the first edge 321 and/or the second edge 322 may have different shapes. For example, the first edge 321 may also be straight, but an edge curved inwards 321 may help to direct the working liquid radially outwards as well as to enhance the water hammer effect.

The radius of curvature of the curved edges 321 may increase from the first cylinder 311 to the second cylinder 312, and so on. A radius of curvature may for example be between 0.1 and 0.5 mm.

The through holes 320 may have a substantially elliptical cross-section. This cross-section may be taken perpendicular to a radial direction. At an outer surface 315, 317, 319, a major axis of the ellipse may be between 3 and 10 mm, and a minor axis of the ellipse may be between 1 and 5 mm In embodiments. An elliptical cross-section of the through holes 320 may be particularly suitable for achieving and enhancing the water hammer and cavitation effects. Other shapes of a cross-section of a through hole 320 may be possible. For example, a cross-section of a hole 320 may be oval, oblong, or circular.

In general, the shape and dimensions of the through holes 320 may be adapted to the working liquid to be used, and in particular to the type and size of the solid material mixed with the working liquid. The shape and internal dimensions of the through holes 320 may be varied considering that a speed of a hole increases with an increasing distance to the center of the first cylinder 311.

Also, a size of the through holes (in particular in a circumferential direction) of the cylinders 311, 312, 313 may decrease from the radially innermost cylinder 311 to the radially outermost cylinder 13. A through hole may for example have a radius between 12 mm to less than 1 mm. Although it may depend on the number of cylinders used, a most radially inner cylinder may have a radius between 10 and 12 mm, and a most radially outer cylinder may have a radius between 0.5 mm and 2 mm In embodiments.

In embodiments, at least some of the through holes 320 of the first cylinder 311 and the second cylinder 312 may be arranged in rows 326 that overlap in a radial direction (see FIG. 3A). A row extends in a circumferential direction of the corresponding cylinder. The axial position of one or more of the rows of the first cylinder may coincide with the axial position of one or more rows of holes of the second cylinder. The movement of the working liquid towards and through the second cylinder (and additional cylinders) may be facilitated. The through holes 320 may also be arranged in columns 327. A column extends in an axial direction of the corresponding cylinder.

A distance or pitch along adjacent through holes 320 of the second cylinder 312 may be larger than a distance between adjacent through holes 320 of the first cylinder 311. This pitch may be measured in circumferential direction. A pitch between adjacent through holes increasing for the cylinders when moving in a radially outwards direction may help to move the material radially outwards. In embodiments, a pitch between two adjacent through holes 320 may be between 5 and 10 mm.

The core further can include a housing enclosing at least the first cylinder 311 and the second cylinder 312. The housing may form a chamber in which the first cylinder 311 and the second cylinder 312 are arranged. Any suitable coupling between the cylinders 311, 312, 313 and a mechanism for rotating the cylinders, for example a shaft, and between the cylinders 311, 312, 313 and the housing may be provided.

As in the previously illustrated embodiments, one or more drives may be provided for rotating a shaft, and therefore rotating the corresponding cylinder(s). In embodiments, the apparatus may include one shaft connected to the cylinder(s) to be rotated in one direction, and another shaft connected to the cylinder(s) to be rotated in the opposite direction. Each shaft may be provided at opposite ends of the core of the apparatus.

At least one of the cylinders 311, 312, 313 may be rotatable. In particular, all the cylinders may be rotatable. Alternating cylinders may be rotated in a same direction. For example, the first 311 and the third 313 cylinders may be rotated in a same direction opposite to a direction of rotation of the second cylinder 312. In other embodiments, two adjacent cylinders may be rotated in a same direction, for example at different speed of rotation.

The cylinders 311, 312, 313 may be arranged in a horizontal configuration (rotation about a horizontal axis, the axial direction is parallel to the horizontal axis). In other embodiments, the cylinders may be arranged in a vertical configuration (rotation about a vertical axis), or in a different configuration.

The working liquid may be axially introduced into the core and the first cylinder 311 through a shaft for rotating the first cylinder 311. The housing of the core may include one or more exits for the working liquid with the material of smaller size.

Similarly as for the previous embodiments, the cylinders 311, 312, 313 may include or may be made of a ceramic material or include a ceramic coating.

During operation, the core may reach high temperatures, for example temperatures above 100° C. A cooling system may be provided for cooling the core. For example, the housing may include conduits through which a suitable cooling fluid may be circulated.

The core may further include a plurality of grinding balls within the first cylinder 311. If the grinding balls are present, a size of the solid material introduced in the first cylinder 311 may be bigger, and the grinding balls may reduce its size until the solid material is small enough to enter the through holes of the first cylinder 311.

The core may be incorporated in an apparatus or system as described herein. According to a further aspect, an apparatus for obtaining particles from a material is provided.

An apparatus may include a core 310 as described with reference to FIGS. 3A and 3B and one or more inlets for introducing the water and soil particles such as sand in the apparatus, either already mixed or separately, before they are mixed. The apparatus may further include a mixing chamber for mixing the sand and water. Mixing may be performed with any suitable mixing element, such as any suitable stirrer, optionally a magnetic stirrer.

The apparatus may be configured to dose the quantity of water containing the sand to be introduced in the core 310. For example, one or more valves may be used. The apparatus may further include valves in other portions of the apparatus for regulating the flow of the working liquid through the apparatus.

The apparatus may include a system for introducing one or more fluids for controlling or setting an atmosphere within a path of the apparatus through which the material is to travel. Controlling or setting of the atmosphere can, in embodiments, occur before the water containing the soil particles is introduced into the core 310 for the first time.

As previously indicated, the apparatus may also include one or more drives for rotating at least one of the first cylinder 311 and the second cylinder 312. A drive may for example be a motor.

The apparatus 331 may further include a system for generating an under pressure for removing the working liquid with material of smaller size from the core 310. In particular, the system may be configured to create an under pressure in an outlet of the core 10.

The material of smaller size may be separated from the working liquid after leaving the core 310. The apparatus 331 may include a system 337 for separating the solid material from the working liquid. An example of such a system may be a centrifugal separator. Other suitable systems may be used. System 337 may be configured to separate material by size or density In embodiments. The system 337 may separate the solid material within the working liquid in two or more groups according to size or other features of the components of the material.

In embodiments, the system 337 for separating the solid material from the working liquid and the system for generating an under pressure for removing the working liquid with the solid material from the core 310 may be the same.

After leaving the core 310, the solid material may include a portion of nanoparticles which have a desired size and are therefore ready to be collected, and may include a portion of nanoparticles or material of a bigger size which has not yet reached the desired size. In embodiments, the nanoparticles which are ready may be directly removed from the apparatus 331. In other embodiments, the apparatus 331 may include a system 338 configured to collect the nanoparticles which have reached a desired size. Such a collection system 338 may include an element configured to suck the nanoparticles towards an inside of the system 338.

The apparatus may further include a plurality of valves. The valves may regulate the passage of the working liquid fluid through a path of the apparatus. The apparatus may further include one or more pumps for moving the working fluid through the apparatus. For example, centrifugal pumps, membrane pumps and/or tesla pumps may be used.

The apparatus may further include one or more heaters such as microwave heaters, plasma heaters or induction heaters. In preferred embodiments, advantage is taken of high ambient temperatures in areas such as deserts to increase a temperature inside the core.

The apparatus may include or may be connected with one or more storage containers that store water, sand, either jointly or separately.

As previously described, such an apparatus may further include a plurality of sensors, for example flow sensors, temperature sensors, humidity sensors, pressure sensors and rotational speed sensors. A control unit may control the operation of the apparatus during the production of nanoparticles and hydrogen production based on real-time data obtained by the sensors. As before, ultrasound generators may be used, as well as the introduction of gases (for example, carbon dioxide may be employed).

The collisions between the solid material as well as the pressure waves and bubble collapse due to the water hammer and cavitation effects may help to effectively obtain material of smaller size, and in particular nanoparticles.

In any of the hereinbefore described embodiments, the sand particles and the water may be mixed prior to intruding them into the mechanical mill. In any of the hereinbefore described embodiments, the method may include extracting obtained nanoparticles from the mechanical mill.

Particular aspects, embodiments and elements of aspects or embodiments disclosed herein can be combined together in any number and order to form new aspects and embodiments that form part of this disclosure.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is not limited to the particular systems, devices and methods described, as these may vary. The terminology used in the description is for the purpose of describing the particular versions or embodiments only and is not intended to limit the scope.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "comprising" should be interpreted as "including but not limited to," the term "having" should be interpreted as "having at least," the term "can include" should be interpreted as "can include but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim can include the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "including" means "including, but not limited to."

As used herein, the term "about" means plus or minus 10% of the numerical value of the number with which it is being used. For example, "about 50%" means in the range of 45-55%, and also can include exactly 50%. That is, any value herein modified by "about" also discloses the value itself.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range can include each individual member. Thus, for example, a group having 1-3 compounds refers to groups having 1, 2, or 3 compounds. Similarly, a group having 1-5 compounds refers to groups having 1, 2, 3, 4, or 5 compounds, and so forth.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed is:

1. A method for producing hydrogen, comprising:
introducing water and soil particles into a mechanical mill;
introducing carbon dioxide into the mechanical mill;
activating the mechanical mill to accelerate the water and the soil particles, thereby producing nanoparticles; and
producing hydrogen from a reaction between the nanoparticles and the water.

2. The method of claim 1, wherein the soil particles comprise sand particles.

3. The method of claim 1, wherein the soil particles comprise Sahara desert sand particles.

4. The method of claim 1, wherein the water comprises seawater, waste water, or a combination thereof.

5. The method of claim 1, wherein the soil particles and the water are mixed prior to introducing the soil particles and the water into the mechanical mill.

6. The method of claim 1, further comprising introducing a hydroxide compound to mechanical mill.

7. The method of claim 1, further comprising collecting the hydrogen from the mechanical mill.

8. The method of claim 1, further comprising collecting the nanoparticles from the mechanical mill.

9. The method of claim 1, wherein accelerating the water and the soil particles causes a cavitation effect, and wherein changing a flow direction of the water causes a water hammer effect.

10. A method for producing hydrogen, comprising:
providing a mechanical mill for reducing a size of particles; wherein the mechanical mill comprises:
a core for accelerating particles, the core comprising:
a first disc and a second disc facing the first disc in an axial direction;

wherein each of the first disc and the second disc comprises a plurality of concentric rings and a plurality of concentric channels alternately interleaved with the plurality of concentric rings; and wherein the first disc, the second disc, or a combination thereof are rotated;

introducing water into the mechanical mill;

introducing soil particles into the mechanical mill; and activating the mechanical mill to accelerate the water and the soil particles;

thereby producing nanoparticles from the soil particles and producing hydrogen from a reaction between the nanoparticles and the water.

11. The method of claim 10, wherein each of the first disc and the second disc comprises:

a plurality of holes extending from the plurality of concentric channels and the plurality of concentric rings at an angle of between 2° and 89° with respect to the axial direction;

wherein the plurality of concentric rings of the first disc are arranged facing the plurality of concentric channels of the second disc; and wherein the plurality of concentric rings of the second disc are arranged facing the plurality of concentric channels of the first disc.

12. The method of claim 10, wherein each of the plurality of concentric rings comprises:

a blade base and a plurality of hypersonic blades arranged on the blade base;

wherein each of the plurality of hypersonic blades comprises a sharp leading edge, a sharp trailing edge and a suction surface and pressure surface configured to produce an expansion wave;

wherein each of the plurality of hypersonic blades of the plurality of concentric rings of the first disc are arranged in the channels of the second disc; and wherein each of the plurality of hypersonic blades of the plurality of concentric rings of the second disc are arranged in the channels of the first disc.

13. The method of claim 10, wherein the first disc is rotated in a first direction, and the second disc is rotated in a second direction.

14. The method of claim 10, further comprising collecting the hydrogen from the mechanical mill.

15. The method of claim 10, wherein accelerating the water and the soil particles causes a cavitation effect, and wherein changing a flow direction of the water causes a water hammer effect.

16. A method for producing hydrogen, comprising:

providing a mechanical mill for reducing a size of particles; wherein the mechanical mill comprises:

a core for accelerating particles, the core comprising:

a first cylinder having a radially outer surface and a radially inner surface, and a second cylinder having a radially outer surface and a radially inner surface; and wherein the second cylinder radially surrounds the first cylinder, and the first cylinder, the second cylinder, or a combination thereof are rotated;

introducing water into the mechanical mill;

introducing soil particles into the mechanical mill;

activating the mechanical mill to accelerate the water and the soil particles;

thereby producing nanoparticles from the soil particles and producing hydrogen from a reaction between the nanoparticles and the water.

17. The method of claim 16, wherein the first cylinder comprises a plurality of first through holes extending from the radially inner surface to the radially outer surface of the first cylinder and wherein the second cylinder comprises a plurality of second through holes extending from the radially inner surface to the radially outer surface of the second cylinder;

wherein the plurality of first through holes and the plurality of second through holes have a smaller cross-section at the radially inner surface than at the radially outer surface.

18. The method of claim 16, wherein the first cylinder is rotated in a first direction, and the second cylinder is rotated in a second direction.

19. The method of claim 16, wherein accelerating the water and the soil particles causes a cavitation effect, and wherein changing a flow direction of the water causes a water hammer effect.

* * * * *